United States Patent [19]

Magin et al.

[11] 4,387,985

[45] Jun. 14, 1983

[54] UNIQUE COPYBOARD HAVING UNIQUE LIGHT ATTENUATOR

[75] Inventors: Irving J. Magin; Erik K. Nelson, both of Fairport, N.Y.

[73] Assignee: Itek Corporation, Lexington, Mass.

[21] Appl. No.: 308,329

[22] Filed: Oct. 5, 1981

[51] Int. Cl.³ .............................................. G03B 27/72
[52] U.S. Cl. ...................... 355/71; 350/314; 355/77; 356/235
[58] Field of Search ............... 350/314; 356/235, 243; 355/71, 77, 70

[56] References Cited

U.S. PATENT DOCUMENTS

| | | | |
|---|---|---|---|
| 2,384,578 | 9/1945 | Turner | 350/314 |
| 3,279,311 | 10/1966 | Lichtner | 355/71 |
| 3,375,752 | 4/1968 | Fairbanks et al. | 355/70 |
| 3,519,346 | 7/1970 | Robbins | 355/77 |
| 4,059,357 | 11/1977 | Klein | 356/243 |
| 4,260,256 | 4/1981 | Smart | 356/235 |

*Primary Examiner*—Richard A. Wintercorn
*Attorney, Agent, or Firm*—Homer O. Blair; Robert L. Nathans; Gerald H. Glanzman

[57] ABSTRACT

A unique light attenuator is positioned between a bank of lamps and the underside of a light diffuser which supports a subject to be photographed in a process camera, such light attenuator comprising a first circular pattern of constant width, constant density lines and a second superimposed pattern of straight lines which compensate for nonuniformity of illumination of the subject.

7 Claims, 3 Drawing Figures

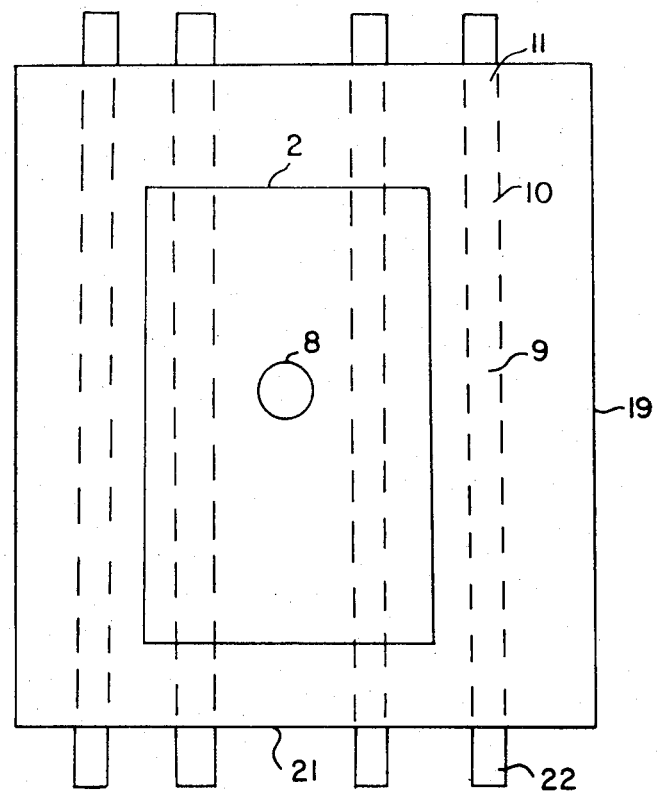
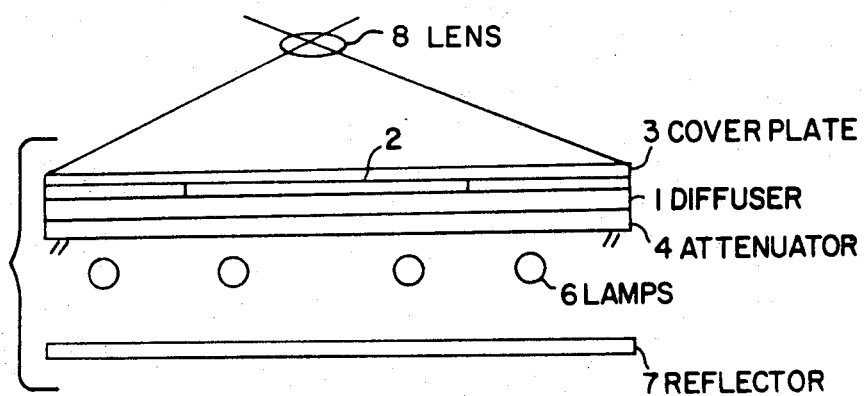

UNIQUE COPYBOARD HAVING UNIQUE LIGHT ATTENUATOR

BACKGROUND OF THE INVENTION

This invention relates to the field of back-lighted copyboards used in process cameras. In process cameras subjects to be photographed, such as the layout of an advertisement, are positioned upon an illuminated copyboard and the image thereof is projected by a lens system upon a photosensitive medium to produce positive or negative stats, which in turn may be employed to produce printing plates. Copyboard lighting methods intended to correct the problems engendered by the cosine$^4$ law are old in the art. For example, in the U.S. Pat. No. 3,375,752, issued to Henry Fairbanks and Thomas Madigan, Jr., a copyboard illumination system is disclosed which compensates for the cosine$^4$ law for wide-angle camera lenses. The cosine$^4$ law holds that the intensity of the object off the axis of the lens is decreased by a function of the cosine$^4$ of the angle of the object from the lens axis, which in turn requires that the edges of the copy be more brightly illuminated than the center, to obtain an image of even intensity. In the aforesaid patent, special light fixtures are provided over the copyboard for producing higher illumination intensities of the noncentral portions of the copyboard. The detrimental effects of this law are also described in U.S. Pat. No. 3,519,346, issued to Daniel H. Robbins.

It is an object of the present invention, unlike above mentioned patents, to provide a back-lighted copyboard which employs a special unique light attenuator, which may be inexpensively manufactured, and which produces consistent results in terms of eliminating the detrimental effect of the cosine$^4$ law. It is also desirable to back-light the copyboard by means of elongated fluorescent lamps which inherently produce unequal illumination due to the inverse square law and due to an inherent reduction in the intensity of light generated at end portions of the elongated lamps.

It is thus an object of the present invention to employ a special light attenuator which compensates for both cosine$^4$ law characteristics of a projection lens and at the same time, compensates for the above mentioned unequal intensity produced upon a light diffuser positioned over a bank of elongated lamps due to the elongated nature of such lamps.

SUMMARY OF THE INVENTION

The above stated objects are accomplished in the most preferred embodiment by providing a unique light attenuator which is positioned between a bank of fluorescent lamps and a light diffuser plate upon which a subject to be photographed is positioned. The unique light attenuator comprises a transparent sheet having a plurality of light attenuating constant width, constant density, circular lines concentric with a central point upon the attenuator, which point is preferably on the optical axis of the projection lens. The spacing between the lines increases in a direction away from the center of the sheet. Preferably, a plurality of constant width, constant density light attenuating straight lines are also formed upon the attenuator, the distances between the straight lines being constant and the lines being oriented parallel to the longitudinal axis of the fluorescent tubes.

Other objects, features and advantages of the present invention will become apparent upon study of the following description taken in conjunction with the figures in which:

FIG. 1 discloses a side view of a preferred back-light copyboard employing the unique light attenuator;

FIG. 2 discloses a plan view of FIG. 1; and,

FIG. 3 illustrates the line pattern formed upon the unique light attenuator.

DETAILED DESCRIPTION

Figure 3:
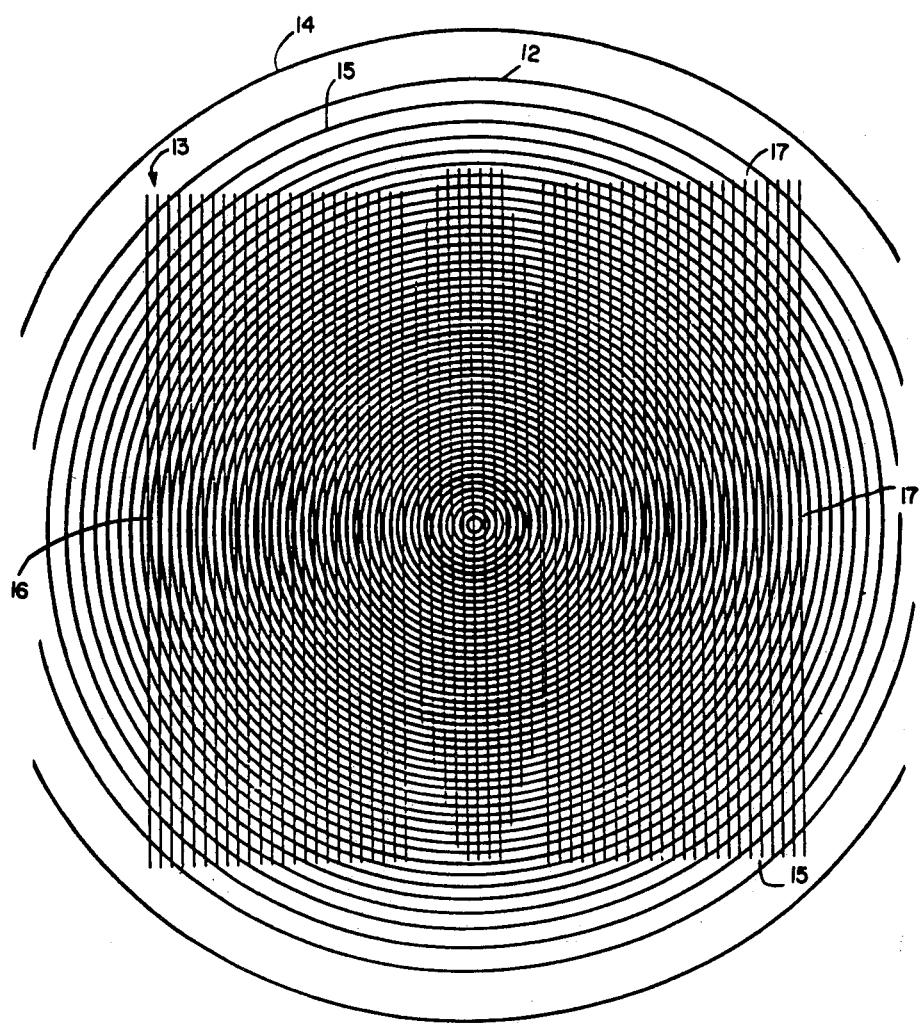

In FIG. 1, a rectangular diffuser plate 1 supports a subject 2 to be photographed, which is held flat over diffuser 1 by a glass cover plate 3. The above mentioned light attenuator 4 is positioned between a lamp bank 6 and diffuser plate 1 which comprises a translucent opal light diffusion plate, while cover plate 3 comprises a transparent glass plate preferably hinged to the copyboard. The fluorescent lamps of lamp bank 6 are conventional types, 22 inches in length, and are spaced approximately as shown, to illuminate attenuator 4 and diffuser 1. Reflector 7 is positioned under lamp bank 6 in order to redirect light upwardly, such reflector comprising a flat white sheet in the commercial embodiment of the invention. Diffuser 1 and attenuator 4 will transmit light to illuminate subject 2, the image of which is projected by lens 8 upon a photosensitive medium, not shown, as it forms no part of the present invention.

Referring now to FIG. 3, a plurality of light attenuating constant width, constant density circular lines 12 concentric with a central "bullseye" point upon the attenuator are illustrated. As may be seen, the distances between the circular lines continuously increase along any radial line emanating from the central point. The result of this pattern is to compensate for the cosine$^4$ lens fall-off phenomenon previously described, since the circular pattern will attenuator light to a greater degree at central portions of the copyboard relative to less centralized portions. In the most preferred embodiment, however, the elongated fluorescent lamps additionally contribute a non-uniform illumination of light diffuser 1 due to a second phenomenon which includes the well known inverse square law. In the absence of attenuator 4, it has been found that the light intensity at point 9 on the diffuser 1 shown in FIG. 2 will be greater than the light intensity at point 11, since point 9 is closer to most light emitting surface portions of the lamp compared to less centralized points such as points 10 and 11. A second contribution to this variation in light intensity in a direction parallel to the lamp axes, is the result of non-linearity in the intensity of the light generated by the lamps due to the arcing phenomenon therein. Hence, the rectangular line length pattern 13 is made somewhat smaller than the first pattern of circular lines as shown. Additionally, the lines making up the second straight line pattern 13 are preferably oriented parallel to the longtitudinal axes of the lamps. The integrated density of the combined first and second patterns in the neighborhood of a horizontal line through the central portion of the attenuator, perpendicular to the straight lines, will be somewhat greater than other noncentralized lines perpendicular to the straight lines, and thus, the nonuniformity of intensity due to the inverse square law is therefore compensated for. Thus, a second rectangular line pattern 13 is superimposed over the pattern 12, consisting of circular lines to balance the intensity of light, which intensity would otherwise vary along the longitudinal axes of the lamps. In the commercial embodiment, the outer most arc 14 has a radius of 10 inches, and circular line 15 has a radius of about 8½ inches. The width of the straight line pattern between points 16 and 17 and the length of the straight line pattern between points 17 and 15 are about 13 inches. The straight lines are separated by a distance of 0.22 inches. The unique attenuator of FIG. 3 is positioned under the light diffuser 1, and the straight lines of the diffuser are oriented parallel to diffuser edge 19, of FIG. 2. The width 21 of diffuser 1 is 14 inches, and its length is 18 inches. The central "bullseye" point of the pattern of FIG. 3 should be positioned at or near the optical axis of projection lens 8.

It should be understood that other components and configurations may be substituted for those described in order to practice the invention, and the invention is to be limited only by the permissable scope of the following claims. For example, similar results may be had wherein the circular pattern employs evenly spaced arcs having continuously decreasing line widths or thicknesses as the radii increase. Thus, the spacing between the lines increases as in the preferred embodiment previously described.

We claim:

1. In a process camera having a bank of fluorescent lamps for illuminating a subject to be photographed, including a flat light diffuser plate positioned over said bank of lamps:
   a transparent cover plate positionable over said light diffuser plate to maintain said subject to be photographed flat against the upper surface of said light diffuser plate;
   a lens system for projecting images of said subject upon a photosensitive surface; the improvement comprising:
   a flat light attenuator positioned between said bank of fluorescent lamps and said light diffusion plate, said attenuator having a large plurality of light attenuating, constant density, circular lines thereon, concentric with a central point upon said attenuator, the spacing between said circular lines continuously increasing along radial paths emanating from said central point.

2. In a process camera having a bank of fluorescent lamps for illuminating a subject to be photographed; a flat light diffuser plate positioned over said bank of lamps;
   a transparent cover plate positionable over said light diffuser plate to maintain said subject to be photographed flat against the upper surface of said light diffuser plate;
   a lens system for projecting images of said subject upon a photosensitive surface; the improvement comprising:
   a flat light attenuator positioned between said bank of fluorescent lamps and said light diffuser plate, said attenuator having a large plurality of light attenuating, constant density, circular lines, concentric with a central point upon said attenuator, the spacing between said circular lines continuously increasing along radial paths emanating from said central point, together with a plurality of constant density, light attenuating straight lines, overlaying a major portion of said attenuator, the distance between said straight lines being constant.

3. In a process camera having a bank of fluorescent lamps for illuminating a subject to be photographed, including a flat light diffuser plate positioned over said bank of lamps:
   a transparent cover plate positionable voer said light diffuser plate to maintain said subject to be photographed flat against the upper surface of said light diffuser;
   a lens system for projecting images of said subject upon a photosensitive surface; the improvement comprising:
   a flat light attenuator positioned between said bank of luorescent lamps and said light diffusion plate, said attenuator having a large plurality of light attenuating, constant width, constant density, circular lines thereon, concentric with a central point upon said attenuator, the spacing between said circular lines continuously increasing along radial paths emanating from said central point.

4. In a process camera having a bank of fluorescent lamps for illuminating a subject to be photographed; a flat light diffuser plate positioned over said bank lf lamps;
   a transparent cover plate positionable over said light diffuser plate to maintain said subject to be photographed flat against the upper surface of said light diffuser plate;
   a lens system for projecting images of said subject upon a photosensitive surface; the improvement comprising:
   a flat light attenuator positioned between said bank of fluorescent lamps and said light diffuser plate, said attenuator having a large plurality of light attenuating, constant width, constant density, circular lines, concentric with a central point upon said attenuator, the spacing between said circular line- continuously increasing along
   radial paths emanating from said central point, together with a plurality of constant width, constant density, light attenuating straight lines, overlaying a major portion of said attenuator, the distance between said straight lines being constant.

5. In a process camera having support means for supporting a subject to be photographed together with subject illuminating means for illuminating said subject and a lens system for projecting images of said subject upon a photosensitive medium, the improvement comprising:
   a light attenuator positioned between said subject illumination means and said subject, said attenuator having a plurality of light attenuating, constant density, circular lines, concentric with a central point upon said attenuator, the spacing between said circular lines continuously increasing along radial paths emanating from said central point, said light attenuator further including a plurality of constant density, light attenuating straight lines overlaying a major portion of said attenuator, and wherein said subject illumination means comprises elongated light emitting elements having longitudinal axes, said straight lines being oriented parallel to said longitudinal axes of said elongated light emitting elements.

6. In a process camera having support means for supporting a subject to be photographed together with subject illumination means for illuminating said subject and a lens system for projecting images of said subject upon a photosensitive medium, the improvement comprising:
   a light attenuator positioned between said subject illuminating means and said subject, said attenuator having a plurality of light attenuating, constant width, constant density, circular lines, concentric with a central point upon said attenuator, the spacing between said circular lines continuously increasing along radial paths emanating from said central point, said light attenuator further including a plurality of constant width, constant density, light attenuating straight lines overlaying a major portion of said attenuator, the distances between said straight lines being constant, and wherein said subject illumination means comprises elongated light emitting elements having longitudinal axes, said straight lines being oriented parallel to said longitudinal axes of said elongated light emitting elements.

7. In a process camera having support means for supporting a subject to be photographed together with subject illumination means for illuminating said subject and a lens system for projecting images of said subject upon a photosensitive medium, the improvement comprising:

a light attenuator positioned between said subject illumination means and said subject, said attenuator having a plurality of light attenuating, constant width, constant density, circular lines, concentric with a central point upon said attenuator, the spacing between said circular lines continuously increasing along radial paths emanating from said central point, said light attenuator further including a plurality of constant width, constant density, light attenuating straight lines overlaying a major portion of said attenuator, the distances between said straight lines being constant, and wherein said subject illumination means comprises elongated light emitting elements having longitudinal axes, said straight lines being oriented parallel to said longitudinal axes of said elongated light emitting elements.

* * * * *